United States Patent [19]
Gellert

[11] Patent Number: 5,282,735
[45] Date of Patent: Feb. 1, 1994

[54] INJECTION MOLDING NOZZLE WITH PARTIALLY UNHEATED HEATING ELEMENT

[76] Inventor: Jobst U. Gellert, 7A Prince Street, Georgetown, Ontario, Canada, L7G 2X1

[21] Appl. No.: 986,601

[22] Filed: Dec. 7, 1992

[30] Foreign Application Priority Data

Nov. 19, 1992 [CA] Canada ............... 2083413-7

[51] Int. Cl.⁵ .................................................. B29C 45/20
[52] U.S. Cl. ...................................... 425/549; 29/611; 264/328.15; 425/570; 425/572
[58] Field of Search ............... 425/549, 572, 570; 264/328.15; 29/611

[56] References Cited

U.S. PATENT DOCUMENTS 4,557,685 12/1985 Gellert ........................... 425/549

Primary Examiner—Tim Heitbrink
Attorney, Agent, or Firm—Dalesman & Company

[57] ABSTRACT

An injection molding nozzle and method of making it having an electrical heating element extending in a pair of alternating coils in a spiral channel around a central melt passage. The heating element has a U-shaped bend near the forward end of the nozzle and two ends at an external terminal near the rear end. A central wire in the heating element has a fine coiled heating portion extending between two larger diameter conductive portions which extend to the terminal. One of the conductive portions of the central wire is a predetermined length longer than the other and extends in one of the alternating coils of the heating element along a rear portion of the nozzle adjacent the terminal. The heating portion of the wire extends in both of the alternating coils of the heating element along a forward portion of the nozzle so the heating element provides substantially less heat along the rear portion than along the forward portion of the nozzle.

1 Claim, 2 Drawing Sheets

INJECTION MOLDING NOZZLE WITH PARTIALLY UNHEATED HEATING ELEMENT

BACKGROUND OF THE INVENTION

This invention relates generally to injection molding and more particularly to a heated nozzle which receives less heat along a portion adjacent its rear end and a method of making it.

Elongated injection molding nozzles having an electrical heating element integrally brazed in a spiral channel extending around a central melt passage with two ends extending to an external terminal to receive a pair of external power leads are well known in the art. An example is shown in the applicants' Canadian patent application serial number 2,057,594-8 filed Dec. 13, 1991 entitled "Method of Making an Injection Molding Nozzle With a Single Heating Element in a Double Channel." The heating element has a central wire with a fine coiled heating portion extending between two conductive portions. The heating portion of the central wire has a small diameter with sufficient resistance to generate considerable heat from the current flowing through it, while the two conductive portions have large enough diameters that very little heat is generated by the current. In these previous nozzles the heating portion of the central wire is in the portion of the heating element extending in the spiral channel around the melt passage, while the two conductive portions of the central wire are only in equal length portions of the heating element extending outwardly from the spiral channel to the external terminal. Thus heat is provided by the heating portion of the central wire along the melt passage, but little or no heat is provided by the conductive portions of the central wire adjacent the external terminal.

In order to maintain the temperature of the melt flowing through the melt passage within a narrow temperature window, it is known that less heat needs to be provided in areas where there is less heat loss. Thus, as mentioned in the applicants' U.S. Pat. No. 4,557,685 which issued Dec. 10, 1985, it is known to provide the spiral channel in which the heating element is wound with a varying pitch, depending upon heating requirements. While this works very well for many applications, it is relatively costly to make and a nozzle with a channel having a particular pitch must be used only for the particular application it was designed for.

SUMMARY OF THE INVENTION

Accordingly, it is an object of the present invention to at least partially overcome the disadvantages of the prior art by providing an injection molding nozzle and method of making it wherein the heating element provides substantially less heat along a portion of the nozzle adjacent the external terminal.

To this end, in one of its aspects, the invention provides an elongated injection molding nozzle having a rear end, a forward end, an integral electrical heating element, and a melt passage extending therethrough from the rear end to the forward end, the electrical heating element having first and second arm portions extending in a pair of alternating spiral coils around the melt passage along the nozzle to respective first and second ends at an external terminal adjacent the rear end of the nozzle, the electrical heating element having a central wire extending through an electrically insulating material in an outer casing, the wire having a fine coiled heating portion extending between first and second conductive portions, the first and second conductive portions being substantially larger in diameter than the heating portion and extending respectively to the first and second ends of the heating element, having the improvement wherein the first conductive portion of the wire of the heating element is a predetermined length longer than the second conductive portion of the wire of the heating element, the first conductive portion of the wire of the heating element extending in one of the spiral coils along a first portion of the nozzle adjacent the external terminal and the heating portion of the wire of the heating element extending in both of the pair of spiral coils along a second portion of the nozzle, whereby the heating element provides substantially less heat along the first portion of the nozzle than along the second portion of the nozzle.

In another of its aspects, the invention provides a method of making an elongated injection molding nozzle having a rear end, a forward end, a generally cylindrical outer surface, and a melt passage extending therethrough from the rear end to the forward end, including making an electrical heating element with a wire extending centrally through an electrically insulating material in an outer casing, the wire having a fine coiled heating portion extending between first and second conductive portions, the first and second conductive portions being substantially larger in diameter than the heating portion and extending respectively to first and second ends of the heating element, winding the heating element in a channel in the outer surface of the nozzle to extend in a pair of alternating spiral coils along the nozzle from a U-shaped bend adjacent the forward end of the nozzle, and integrally brazing the heating element in the channel with the first and second ends of the heating element projecting to an external terminal adjacent the rear end of the nozzle, having the improvement comprising making the heating element of a predetermined length with the first and second conductive portions of the wire in the heating element having equal predetermined lengths, bending the heating element a predetermined distance off center of the heating portion of the wire in the heating element to form first and second arm portions extending from the U-shaped bend, and cutting off the second arm portion of the heating element t be substantially equal in length to the first arm portion, whereby the first conductive portion of the wire of the heating element is a predetermined length longer than the second conductive portion of the wire of the heating element to extend in one of the spiral coils a predetermined distance along the nozzle from the external terminal.

DETAILED DESCRIPTION OF THE INVENTION

Figures 1, 2:
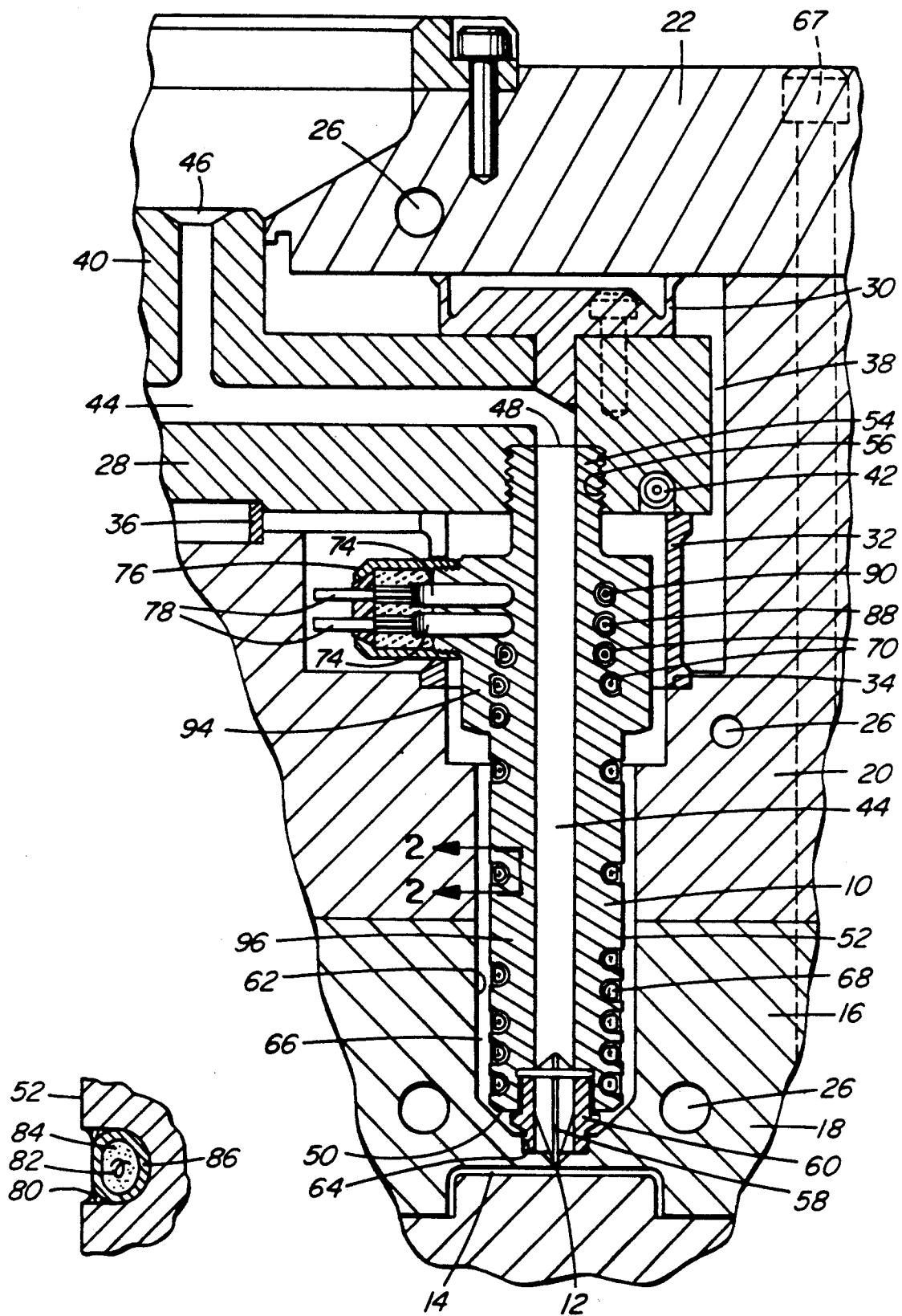
FIG. 1 is a sectional view of a portion of a multi-cavity injection molding system showing a nozzle according to a first embodiment of the invention.
FIG. 2 is a sectional view along line 2—2 in FIG. 1 showing the heating portion of the central wire in the heating element.

Reference is first made to FIG. 1 which shows a portion of a multi-cavity injection molding system having several nozzles 10 according to the invention to convey pressurized plastic melt to respective gates 12 leading to different cavities 14 in the mold 16. In this particular configuration, the mold includes a cavity plate 18, a manifold retainer plate 20, and a backplate 22 which are removably secured together by bolts (not shown). The mold 16 is cooled by pumping cooling water through cooling conduits 26 extending in the cavity plate 18, manifold retainer plate 20, and the back plate 22. An electrically heated steel melt distribution manifold 28 is mounted between the manifold retainer plate 20 and the back plate 22 by spacer members 30 and a support sleeve 32 which extends around each nozzle 10 and sits in a circular seat 34 in the manifold retainer plate 20. The melt distribution manifold 28 is centrally located in this position by a central locating ring 36 which is seated between it and the manifold retainer plate 20. Thus, an insulative air space 38 is provided between the heated manifold 28 and the surrounding cooled manifold retainer plate 20 and back plate 22. The melt distribution manifold 28 has a cylindrical inlet portion 40 and is heated by an integral electrical heating element 42. A melt passage 44 extends from a common inlet 46 in the inlet portion 40 of the manifold 28 and branches outward in the manifold 28 to each nozzle 10 which it extends centrally through to one of the gates 12.

Each nozzle 10 has a rear end 48, a forward end 50, and a generally cylindrical outer surface 52. In this particular embodiment, the nozzle 10 has a threaded head 54 which is screwed into a threaded opening 56 in the manifold 28. In this embodiment, the nozzle 10 has a torpedo 58 and a nozzle seal 60 seated in its forward end 50 in alignment with one of the gates 12. The nozzle 10 is received in a well 62 in the cavity plate 18 and the manifold retainer plate 20 and is accurately located in this position by the threaded head 54 and by the nozzle seal 60 seated in a circular seat 64 in the cavity plate 18. An insulative air space 66 is provided between the heated nozzle 10 and the surrounding cooled mold 16. The nozzle seal 60 also prevents pressurized melt from the melt passage 44 escaping into this insulative air space 66 around the nozzle 10. Bolts 67 which extend through the mold plates to hold them together apply a force through the spacer members 30 to hold the manifold 28 and nozzles 10 securely in this position.

Figure 3:
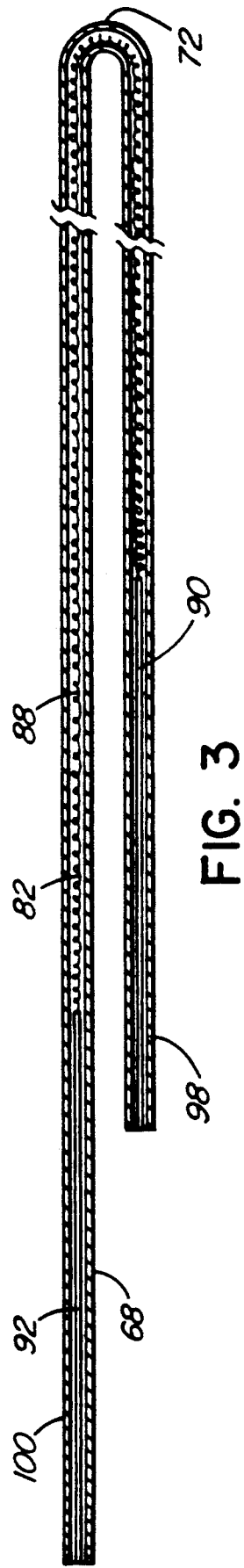
FIG. 3 is a sectional view of the heating element showing how it is bent.
Figure 4:
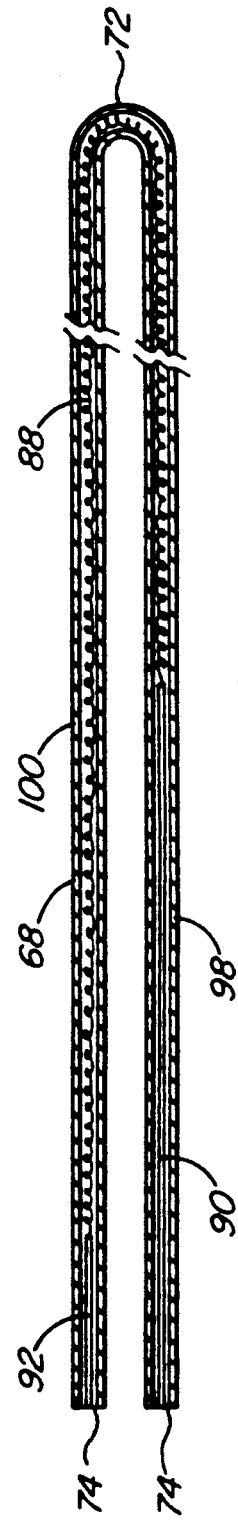
FIG. 4 is a similar view of the heating element after its second arm portion is cut off.

Each nozzle 10 is heated by an electrical heating element 68 extending in a pair of alternating spiral coils 70 along the nozzle 10 around the central melt passage 44. The heating element 68 extends from a U-shaped bend 72 adjacent the forward end 50 to two ends 74 in an external terminal 76 to which a pair of external power leads 78 are connected. As best seen in FIG. 2, the coils 70 of the electrical heating element 68 are integrally brazed in a spiral channel 80 in the outer surface 52 of the nozzle 10. The electrical heating element 68 has a central wire 82 which is surrounded by an electrically insulating material 84 such as magnesium oxide extending in a protective steel casing 86. As seen in FIGS. 3 and 4, the central wire 82 of the heating element 68 has a fine coiled heating portion 88 extending between two conductive portions 90, 92. The coiled heating portion 88 of the central wire 82 has a small diameter with enough resistance to generate sufficient heat from the current flowing through it. On the other hand, the two conductive portions 90, 92 of the central wire 82 of the heating element 68 which extend to the external terminal 76 adjacent the rear end 48 of the nozzle 10 have sufficiently large diameters that very little heat is produced by the current flow.

As seen in FIGS. 1 and 4, in the nozzle 10 according to the invention, the first conductive portion 90 of the central wire 82 of the heating element 68 is a predetermined length longer than the second conductive portion 92 of the central wire 82 of the heating element 68. Thus, when the heating element 68 is wound in the spiral channel 80 in the outer surface 52 of the nozzle 10, the larger diameter first conductive portion 90 of the central wire 82 extends in one of the alternating spiral coils 70 of the heating element 68 along a first portion 94 of the nozzle 10 adjacent the external terminal 76. The heating portion 88 of the central wire 82 extends in the other alternating coil 70 of the heating element 68 along the first portion 94 of the nozzle 10 and in both of the alternating coils 70 of the heating element 68 along a second portion 96 of the nozzle 10 extending towards the forward end 50. Thus, considerably less heat is provided by the heating element 68 along the first rear portion 94 of the nozzle 10 than along the second forward portion 96 of the nozzle 10. In this embodiment this compensates for heat received through the threaded head 54 of the nozzle 10 from the heated manifold 28, although nozzles with other configurations and/or other types of injection molding nozzles such as machine nozzles or manifold nozzles will have different heat requirements. The respective lengths of the first and second conductive portions 90, 92 of the central wire 82 of the heating element 68 required to provide temperature uniformity of the melt flow along the nozzle 10 depends upon such factors as the diameter of the nozzle 10, the pitch of the spiral channel 80, and the mounting configuration of the nozzle 10.

In use, the injection molding system is assembled as shown in FIG. 1. Electrical power is applied to the heating element 42 in the manifold 28 and to the heating elements 68 in the nozzles 10 to heat them to a predetermined operating temperature. Pressurized melt from a molding machine (not shown) is then injected into the melt passage 44 through the common inlet 46 according to a predetermined cycle in a conventional manner. After the cavities 14 are filled, injection pressure is held momentarily to pack and then released. After a short cooling period, the mold is opened to eject the molded products. After ejection, the mold is closed and injection pressure is reapplied to refill the cavities 14. This cycle is continuously repeated with a frequency dependent on the size and shape of the cavities and the type of material being molded.

Reference is now made particularly to FIGS. 3 and 4 to describe the improved method of making the nozzle according to the invention. The heating element 68 is made of a predetermined length with the first and second conductive portions 90, 92 of the central wire 82 of the heating element 68 having equal predetermined lengths. The heating element 68 is bent a predetermined distance off center of the heating portion 88 of the central wire 82 to form first and second arm portions 98, 100 of the heating element 68 extending from a U-shaped bend 72. As seen in FIG. 3, the second arm portion 100 of the heating element 68 is considerably longer than the first arm portion 98, and it is cut off to be substantially the same length as the first arm portion 98. As seen in FIG. 4, this provides a heating element 68 in which the first conductive portion 90 of the central wire 82 is a predetermined length longer than the second conductive portion 92 of the central wire 82. Alternatively, the heating element can be cut prior to bending to produce the same result. The heating element 68 is then wound in the channel 80 in the outer surface 52 of the nozzle 10 with the arm portions 98, 100 extending along the nozzle 10 in the pair of alternating coils 70 from the U-shaped bend 72 adjacent the forward end 50 and the ends 74 projecting to the external terminal 76 adjacent the rear end 48 of the nozzle 10. The shorter second conductive portion 92 of the central wire 82 only extends inwardly from the terminal 76 to the spiral channel 80, whereas the longer first conductive portion 90 also extends in one of the spiral coils 70 a predetermined length along the first rear portion 94 of the nozzle. After the components of the nozzle are assembled as seen in FIG. 1, brazing material such as nickel alloy paste is applied along the joints between them. Brazing material is also applied along the heating element 68 wound in the spiral channel 80 similar to the description in the applicant's U.S. Pat. No. 4,557,685 mentioned above. The assembly is then inserted into a vacuum furnace (not shown) and heated above the melting temperature of the brazing material according to a predetermined cycle. As the furnace is gradually heated, it is evacuated to a relatively high vacuum to remove nearly all of the oxygen. Before the melting temperature of the brazing material is reached, the vacuum is reduced by partially backfilling with an inert gas such as argon or nitrogen. When the nickel alloy brazing material melts, it flows by capillary action along the joints between the components and around the heating element 68 to completely embed it in the channel 80. This brazing in the vacuum furnace provides a metallurgical bonding of the nickel alloy to the steel of the various components to form a metallurgically monolithic integral heated nozzle 10. After the nozzle 10 is cooled and removed from the vacuum furnace, it is machined to provide a smooth outer finish.

While the description of the nozzle and method of making it have been given with respect to preferred embodiments, it will be evident that various modifications are possible without departing from the scope of the invention as understood by those skilled in the art and as defined in the following claims.

The embodiments of the invention in which an exclusive property or privilege is claimed are defined as follows:

1. In an elongated injection molding nozzle having a rear end, a forward end, an integral electrical heating element, and a melt passage extending therethrough from the rear end to the forward end, the electrical heating element having first and second arm portions extending in a pair of alternating spiral coils around the melt passage along the nozzle to respective first and second ends at an external terminal adjacent the rear end of the nozzle, the electrical heating element having a central wire extending through an electrically insulating material in an outer casing, the wire having a fine coiled heating portion extending between first and second conductive portions, the first and second conductive portions being substantially larger in diameter than the heating portion and extending respectively to the first and second ends of the heating element, the improvement wherein, the first conductive portion of the wire of the heating element is a predetermined length longer than the second conductive portion of the wire of the heating element, the first conductive portion of the wire of the heating element extending in one of the spiral coils along a first portion of the nozzle adjacent the external terminal and the heating portion of the wire of the heating element extending in both of the pair of spiral coils along a second portion of the nozzle, whereby the heating element provides substantially less heat along the first portion of the nozzle than along the second portion of the nozzle.

* * * * *